United States Patent [19]

Boggs, III

[11] Patent Number: 5,465,018

[45] Date of Patent: Nov. 7, 1995

[54] SHAFT MOUNTED EDDY CURRENT DRIVE

[76] Inventor: Paul D. Boggs, III, 4701 Old Denton Rd., Fort Worth, Tex. 76117

[21] Appl. No.: 35,981

[22] Filed: Mar. 18, 1993

[51] Int. Cl.[6] ............................................. H02K 49/00
[52] U.S. Cl. ........................... 310/105; 310/95; 310/168; 310/239
[58] Field of Search ............................ 310/94, 95, 105, 310/168, 239, 219, 232, 68 R

[56] References Cited

U.S. PATENT DOCUMENTS

| | | | |
|---|---|---|---|
| 1,164,262 | 12/1915 | Creveling | 310/230 |
| 1,855,281 | 4/1932 | Chilton | 290/38 B |
| 2,616,069 | 10/1952 | Jaeschke | 318/492 |
| 2,657,323 | 10/1953 | Jaeschke | 310/95 |
| 3,294,995 | 12/1966 | Edick | 310/95 |
| 3,303,367 | 2/1967 | Jaeschke et al. | 310/95 |
| 3,525,891 | 8/1970 | Lukawich et al. | 310/23 |
| 3,539,850 | 11/1970 | Sato | 310/68 |
| 3,584,248 | 6/1971 | Higashino et al. | 310/68 |
| 3,670,189 | 6/1972 | Monroe | 310/46 |
| 3,716,788 | 2/1973 | Nishida | 324/174 |
| 3,735,167 | 5/1973 | Wickersheimer | 310/168 |
| 3,745,393 | 7/1973 | Spors | 310/239 |
| 4,090,592 | 5/1978 | Jovick et al. | 188/181 |
| 4,171,495 | 10/1979 | McNinch, Jr. | 310/155 |
| 4,209,213 | 6/1980 | Wussow | 339/5 |
| 4,227,861 | 10/1980 | LaFlame | 416/169 |
| 4,355,709 | 10/1982 | Light | 192/58 |
| 4,400,638 | 8/1983 | Albrecht et al. | 310/95 |
| 4,410,819 | 10/1983 | Kobayashi et al. | 310/105 |
| 4,446,392 | 5/1984 | Jaeschke | |
| 4,526,257 | 7/1985 | Mueller | 192/48.2 |
| 4,864,173 | 9/1989 | Even | 310/93 |
| 5,053,656 | 10/1991 | Hodge | 310/42 |
| 5,260,642 | 11/1993 | Huss | 322/51 |

OTHER PUBLICATIONS

*ABC of Adjustable Speed With Ampli–Speed Magnetic Drive*, E–M Synchronizer, Special Issue 200–SYN–64, Electric Machinery Mfg., pp. 1, 6, 7, last page.
*EM Ampli–Speed Magnetic Drive Horizontal and Vertical*, McGraw–Edison, Electric Machinery brochure 5100–PRD–312A, Sep. 1981.
*EM Ampli–Speed Magnetic Drive Horizontal*, Dresser–Rand, Electric Machinery brochure 5200–PRD–315A, Sep. 1981.
*EM Ampli–Speed Magnetic Drive Vertical*, Dresser–Rand, Electric Machinery brochure 5200–PRD–313A, Sep. 1981.
*MCRT Non–Contact Strain Gage Torquemeters*, S. Himmelstein and Company, Bulletin 761, 1976.

Primary Examiner—Steven L. Stephan
Assistant Examiner—D. R. Haszko
Attorney, Agent, or Firm—Geoffrey A. Mantooth

[57] ABSTRACT

A drive has a hub with first and second end portions and a shoulder located thereon. An armature and sheave assembly is located on bearings on the hub first end portion. The armature forms a cavity for receiving an electromagnet, which abuts against the shoulder. Slip rings are coupled to the electromagnet by way of a fan and a slip ring shaft. The slip rings, which are adjacent to the second end of the hub, can be of a small diameter to extend brush life. In addition, the same size slip rings can be used on different sizes of the drive. Two piece brush holders are provided for each brush. Each brush holder can be disassembled into its respective pieces for cleaning. The brush holders and slip rings can be protected from the environment by a cover.

13 Claims, 3 Drawing Sheets

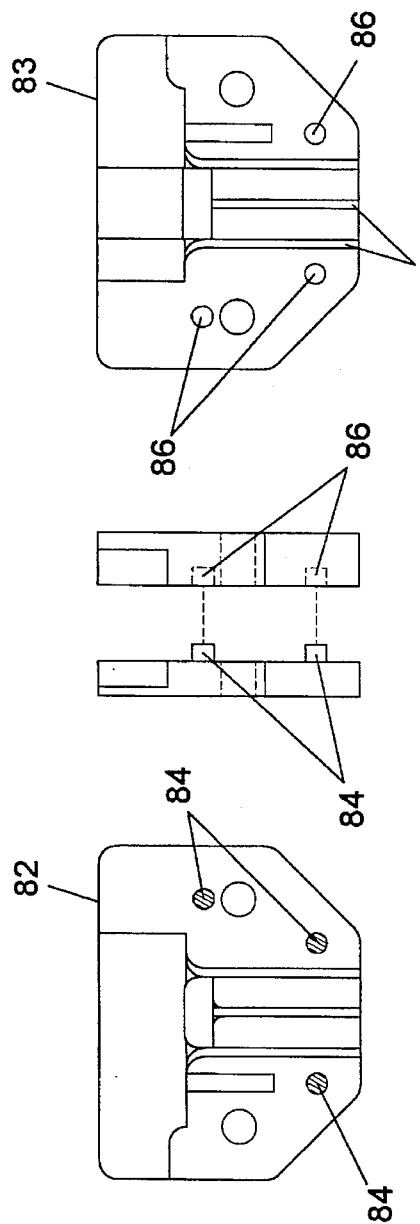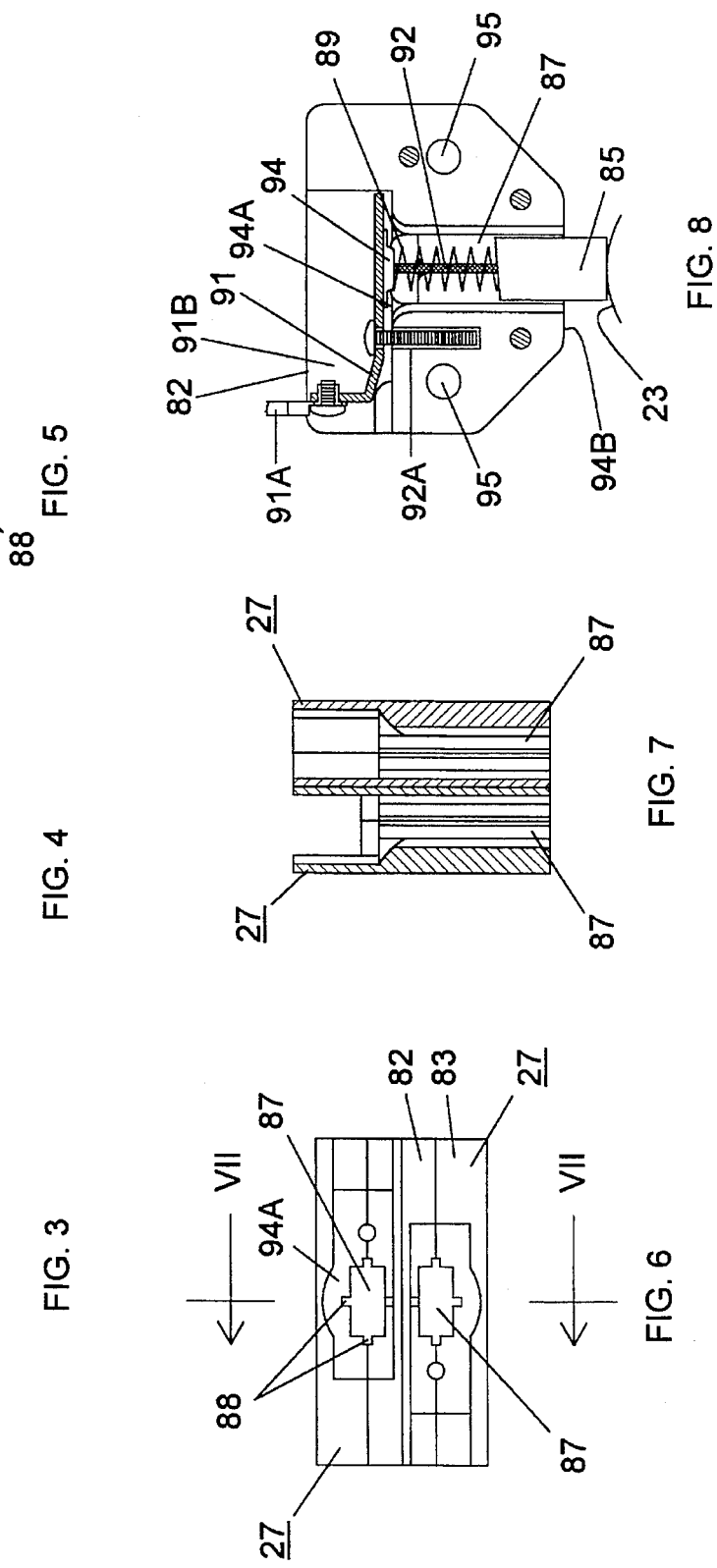

SHAFT MOUNTED EDDY CURRENT DRIVE

FIELD OF THE INVENTION

The present invention relates to variable speed drives that are mounted onto an output shaft of a motor, such as a fixed speed electric motor, and in particular the present invention relates to eddy current drives.

BACKGROUND OF THE INVENTION

There are many applications where it is desirable to have a fixed speed motor provide a variable speed output. For example, in ventilation systems, an ac synchronous motor is used to rotate an air mover, such as a fan. The energy efficiency of this system increases if the speed of the motor remains fixed while the speed delivered to the fan can be varied.

In the prior art, there are variable speed drives that mount onto the output shaft of the motor. Around the outer circumference of the drive are one or more sheaves. The sheaves receive belts that are coupled to a load. The drive permits a controlled amount of slip. At zero slip, the full rotary power of the motor output shaft is applied to rotate the sheaves. At full slip, the output shaft continues to rotate, but the sheaves remain stationary under a load. Thus, at zero slip, the fully rotary power of the motor is applied to the load, while at zero slip, no rotary power is applied to the load.

In Albrecht et al., U.S. Pat. No. 4,400,638, there is disclosed a shaft mounted eddy current drive. The amount of slip is controlled electrically using eddy currents. The output sheaves are mechanically coupled to poles of an electric coil. There are provided opposite, interdigitated poles. An armature provides a magnetic path between the opposite poles. The armature is mechanically coupled to the output shaft of the electric motor. As the motor shaft rotates, the armature also rotates at the same speed as the shaft. In order to rotate the sheaves, current is applied to the coil. This creates an electromagnetic coupling between the poles and the armature, wherein the armature causes the poles and the associated sheaves to rotate.

It is desired to improve upon the prior art drives. The slip rings of the Albrecht et al. drive have the same diameter as, and are located adjacent to, the sheaves. One disadvantage of the slip ring arrangement is the wear on brushes. The chief complaint among customers who buy the prior art drives is brush wear. The brushes must be frequently replaced, adding to the maintenance cost of the drives. The larger the circumference of the slip rings, the shorter the life of the brushes becomes because for each revolution of the motor, the brushes are in frictional contact with a long length of the slip rings.

Another disadvantage of the slip ring arrangement of Albrecht et al. is that as the drive is sized larger or smaller for respective larger or smaller load applications, the circumference of the slip rings change. Thus, the slip rings must be custom made for each size drive. It is desirable to make the slip rings a more uniform size, regardless of the size of the drive, in order to manufacture and repair the drives more efficiently.

Still another disadvantage of the slip ring arrangement of Albrecht et al. is the difficulty in protecting the slip rings and brushes from the environment. If the drive is used outside, it is subjected to moisture, which can reduce the life of the brushes.

SUMMARY OF THE INVENTION

It is an object of the present invention to provide a shaft mounted eddy current drive that has prolonged brush life.

Another object of the present invention is to provide a drive design that uses the same size slip rings regardless of the power requirements of the drive.

Still another object of the present invention is to provide a drive that protects the slip rings and brushes from the environment.

The drive of the present invention includes a hub that is structured and arranged to be coupled to a motor shaft. The hub has a shoulder, which shoulder is coupled to the hub. An electromagnet is mounted on the hub and abuts against the shoulder. The electromagnet is rotatably coupled to the hub. There is a driven member that is mounted to the hub by bearings. The driven member has a load portion and an armature, with the load portion being structured and arranged to be rotatably coupled to a load and the armature being located adjacent to the electromagnet.

The drive of the present invention has several advantages over prior art drives. One advantage is due to the design of the slip rings. The slip rings are located at the outer end of the drive and are of relatively small diameter. In the preferred embodiment, a slip ring shaft provides a support for mounting the slip rings. The small diameter of the slip rings greatly prolongs brush life by presenting a relatively small circumference that the brushes must traverse for each revolution of the slip rings. Because the brushes contact shorter lengths of slip rings per revolution, the lives of the brushes are prolonged.

Also, by providing the slip rings on a separate slip ring shaft, the size of the slip rings is independent of the sizes of the motor shaft, the sheave and the drive in general. Thus, as the design of the drive is enlarged to provide a drive with more horsepower, or reduced to provide a drive with less horsepower, the size of the slip rings, and thus the brush holders, can remain the same. This uniformity in size of slip rings, which is independent of the size of the drive, reduces manufacturing costs while allowing flexibility in producing a product line of plural drives, each of which is designed for a specific horsepower. Inventory costs are reduced as well, because both manufacturer and user need only stock one size of slip rings and brush holders.

The drive also provides a housing or cover for containing and protecting the slip rings and brushes from the elements. This is important for drives that are used outside, as brush life is extended. The cover prevents moisture from contacting the brushes and the slip rings.

The design of the drive allows for easy partial disassembly while maintaining the connection of the drive to the load and to the motor shaft. The brush holders, slip rings, fan and electromagnet can be removed while leaving the hub connected to the motor shaft and the sheaves coupled to the load. This reduces maintenance time because the drive does not have to be completely removed during disassembly.

The drive is more stable in operation because the sheaves are fully mounted on bearings and are located closer to the end of the hub that couples to the end of the motor. Prior art drives mount the brush holder bracket on the same end of the hub as the sheaves. This causes the sheaves to either be mounted further from the motor (which unfavorably loads the motor shaft and produces vibration) or to be only partially mounted onto a bearing (which produces unbalancing and vibration of the sheaves). The drive of the present invention does not suffer these prior art problems because the sheaves are fully supported by the bearings. In addition, the sheaves, as well as the bulk of the mass of the driver, are located closer to the motor than the prior art drives. This drastically reduces the overhung load on the motor shaft, prolonging motor life.

Another advantage of the drive of the present invention is that the sheaves are fully exposed at all times. In the prior art, the brush holder bracket extends across the sheaves. With the drive of the present invention, the slip rings and brush holder bracket are located on the opposite end of the drive from the sheaves. Thus, the belts can be installed onto and removed from the sheaves without removing the brush holder bracket. In addition, a conduit is used to prevent rotation of the brush holder bracket. The conduit is anchored to the motor and extends through the belts. This arrangement allows the belts to be installed and removed without disassembling any part of the drive.

Still another advantage of the drive is the coupling of the electromagnet to the hub and the fan to the electromagnet. The motor shaft rotates the hub, the electromagnet and the fan continuously at motor speed. This continuous movement of the electromagnet and the fan produces continuous cooling of the electromagnet. Prior art drives locate the electromagnet on the driven member, which may be stationary or operating at a low speed. The electromagnet on prior art drives is not cooled as effectively as with the present invention due to the reduced rotational speed. Effective cooling of the electromagnet prolongs the life of the electromagnet.

BRIEF DESCRIPTION OF THE DRAWINGS

FIGS. 3 and 5 are side views showing the interiors of the first and second portions, respectively, of a brush holder, in accordance with a preferred embodiment.

FIG. 4 is an end view showing how the first and second portions of the brush holder fit together.

FIG. 6 is a top plan view of the brush holders.

FIG. 7 is a cross-sectional view taken along lines VII—VII of FIG. 6.

FIG. 8 is a side view of the first portion of a brush holder, with a brush installed, and the second portion removed for clarity.

DESCRIPTION OF THE PREFERRED EMBODIMENT

Figure 1:
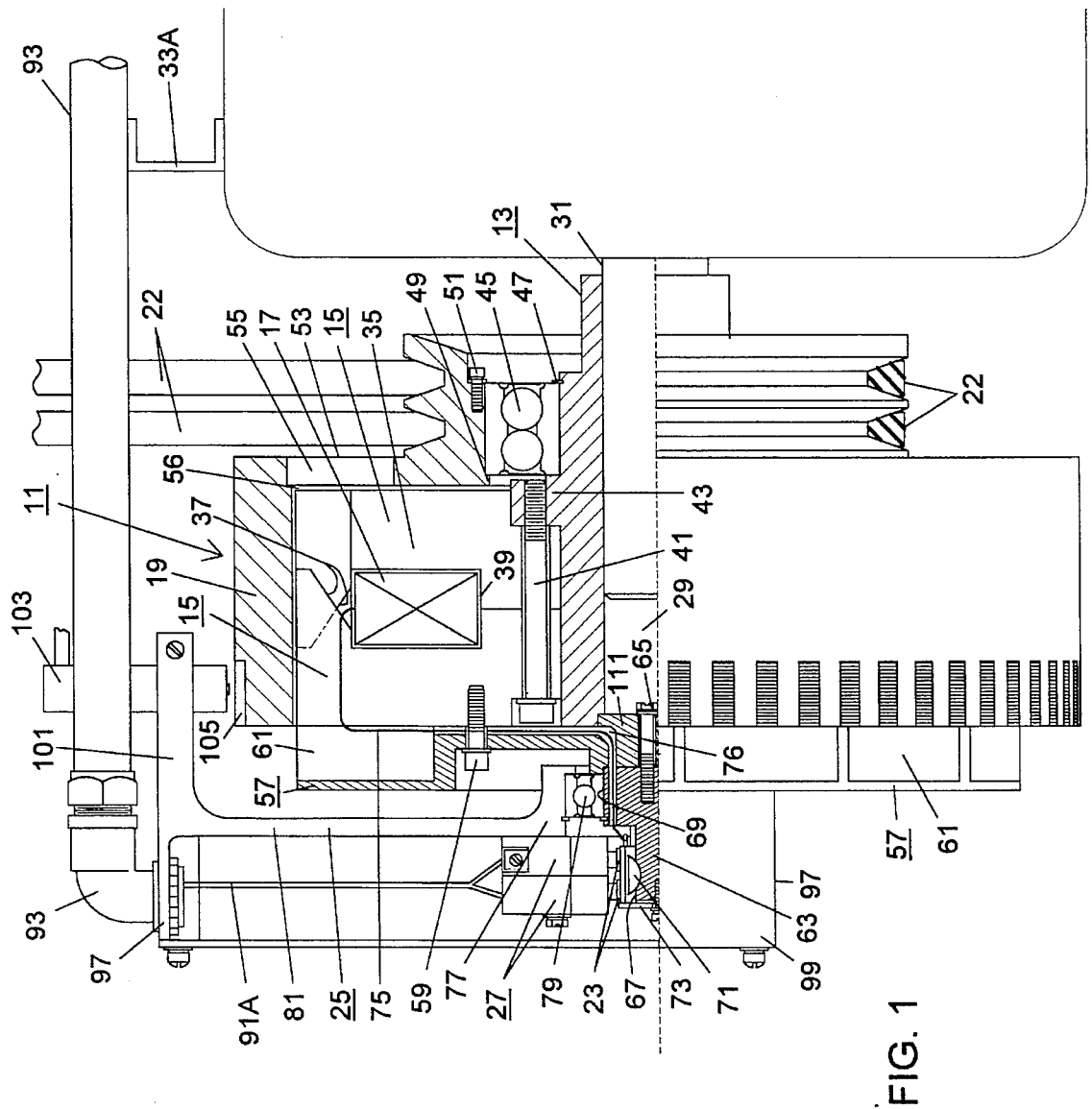
FIG. 1 is a partial cross sectional side view of the shaft mounted eddy current drive of the present invention, in accordance with a preferred embodiment.

In FIG. 1, there is shown a partial cross sectional side view of the drive 11 of the present invention, in accordance with a preferred embodiment. The drive 11 has a shaft mounted portion and a load portion. The shaft mounted portion includes a hub 13, pole pieces 15 and a coil 17. The shaft mounted portion mounts onto the shaft of a motor and is rotated directly by the motor shaft. The load portion is rotated by an electromagnetic field developed by the shaft mounted portion. The load portion is coupled to the load (e.g. a fan) and includes an armature 19 and sheaves 21. In addition, the drive includes slip rings 23, a brush holder bracket 25 and brush holders 27.

The shaft mounted portion will now be described. The hub 13 is generally in the form of a sleeve. The hub 13 has a cylindrical cavity 29 located therein for receiving a shaft 31 of a motor 33. The hub 13 is coupled to the shaft 31 by a conventional and commercially available compression type shrink disk (not shown). Alternatively, the cavity 29 may be keyed or threaded to receive respective keys or threads on the motor shaft. The hub 13 has an outer end portion and an inner end portion (with inner being referenced as closer to the motor and outer being referenced as further from the motor 33).

Mounted on the outer end portion of the hub are the pole pieces 15. There are two pole pieces, an inner piece and an outer piece. Each pole piece 15 is made up of an annular portion 35, with poles 37 extending from the outer diameter of the annular portion and a lip 39 extending from the inner diameter of the annular portion. The poles 37 on an individual pole piece are spaced apart by gaps. When the pole pieces are assembled as shown, the poles from the inner and outer pole pieces are interdigitated so as to form alternating polarities around the circumference of the assembly of pole pieces. The assembled pole pieces 15 encircle the coil 17 of wire. Thus, the coil 17 is encircled by the annular portions 35, lips 39 and poles 37 of the pole pieces. The pole pieces and the coil extend around the circumference of the hub. The pole pieces 15, and thus the encircled coils, are secured to the hub 13 by bolts 41. The hub 13 has a circumferential shoulder 43 that extends radially outward to receive the bolts and to position the pole pieces 15. The pole pieces abut against the shoulder 43.

The load portion will now be described. The sheaves 21 are mounted to the hub 13 by way of bearings 45. In the preferred embodiment, the bearing 45 is a double row ball bearing. Alternatively, the bearing may be two bearings. The bearings 45 are located on the hub between the shoulder 43 and a snap ring 47 that is on the hub. The bearings 45 extend around the circumference of the hub. The sheaves 21 are located around the outer circumference of the bearings. The sheaves 21 are positioned on the bearings by a shoulder 49 on one end and bolts 51 on the other end. The sheaves receive belts 22, which are rotatably coupled to a load such as a fan.

The armature 19 is coupled to the sheaves by a radially extending wall 53. The armature 19 is a hollow cylinder and is made of a material that is high in conductivity and permeability. The wall has openings 55 therethrough that communicate with a cavity 56 formed by the armature 19 and the wall 53. The cavity 56 receives the pole pieces 15. The openings 55 allow air circulation through the pole pieces. The sheaves 21, armature 19 and wall 53 form an integral assembly. Alternatively, an interior sleeve can be press fit into the inside diameter of the armature. The interior sleeve can be made of a material that is suitable for the production of eddy currents (high conductivity, high permeability) while the armature around the sleeve can be designed to dissipate heat.

The slip rings 23 are secured to the pole pieces 15 by way of a fan 57. The fan 57 is located so that the pole pieces 15 are interposed between the fan 57 and the sheaves 21. Bolts 59 secure the fan 57 to the outer pole piece 15. The fan has openings 61 therein so that as the pole pieces rotate, the fan causes air to circulate through the openings 55, 61 and the pole pieces for cooling.

A slip ring shaft 63 is coupled to the fan 57 by bolts 65. The slip ring shaft 63 extends in an axial direction away from the sheaves 21. The slip ring shaft has first and second outer surfaces 67, 69. The first outer surface 67 is located at the outer end of the slip ring shaft. The slip rings 23 are mounted on the first surface 67 with a key 71 and an end plate 73. The end plate 73 is bolted onto the outer end of the slip ring shaft. The slip rings 23 extend around the circumference of the slip ring shaft. Wires 75 connect the slip rings 23 to the coil 17. The wires 75 extend through passageways 76 drilled or otherwise formed in the slip ring shaft 63 and the fan 57.

The brush holder bracket 25 has a sleeve portion 77 that is mounted around the second surface 69 of the slip ring shaft 63 by way of a bearing 79. The bearing 79 is secured in place against a shoulder on the fan 57 and snap rings. The bracket 25 has a radial extension portion 81 that extends past the armature 19.

The brush holders 27 are coupled to the radial extension portion 81 of the brush holder bracket 25. Referring to FIGS. 3–8, there are two brush holders 27, one for each brush 85. Each brush holder 27 has a first portion 82 (shown in FIG. 3) and a second portion 83 (shown in FIG. 5). The first portion 82 is provided with pins 84 on its interior surface, while the second portion 83 is provided with holes 86 for receiving the pins 84. The two portions 82, 83 snap fit together with the pins 84 inserted into the holes 86 (see FIG. 4). Each portion has a groove located therein. When the portions are assembled, the groove forms a generally rectangularly shaped cavity 87 for receiving the carbon brushes 85 (see FIGS. 6 and 8). Each side wall of the cavity 87 has a shallow groove 88 that allows the brushes to move inside the cavity.

Each brush 85 is connected to a contact 94 by a flexible wire 92. A spring 89 is interposed between the brush 85 and the contact 94. The contact 94 has edges that bear on a top surface 94A of the assembled brush holder 27. Thus, the brush 85 is prevented from being pulled out from the bottom 94B of the brush holder. A clip 91 overlies the contact 94. The clip is L-shaped to provide a connection point for a wire 91A. The wires 91A connected to the clips are routed to an external power source by a conduit 93. The clip 91 is secured to the brush holder by a screw 92A. The clip is located inside of a recess 91B on the top of the brush holder. This recess 91B locates the clip 91, and the connection point with the wire 91A entirely within the protective confines of the brush holder. The contact 94 makes electrical contact with the clip 91.

Figure 2:
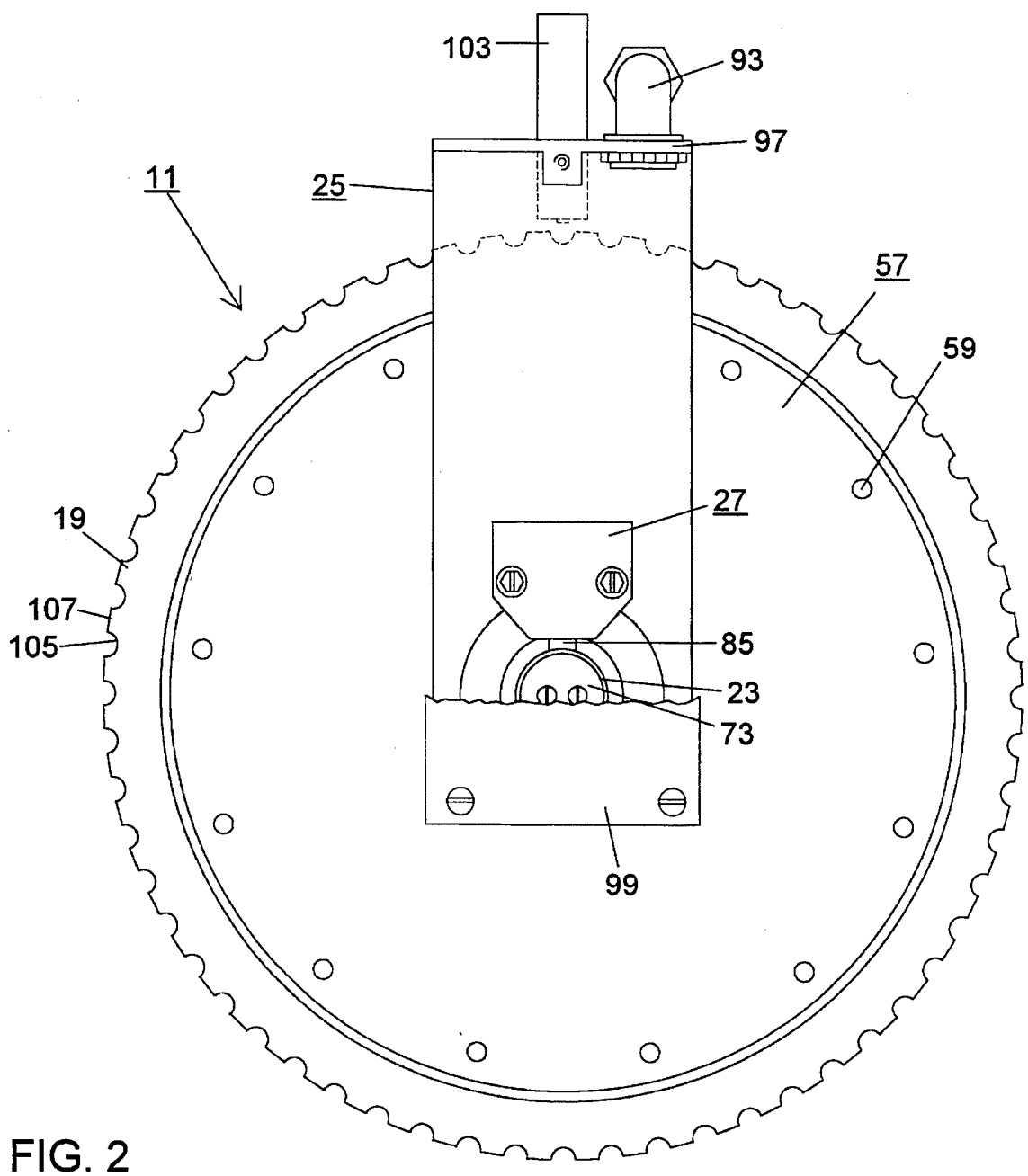
FIG. 2 is a view showing the outer end of the drive, with a housing around the slip rings and brush holder partially cut away.

The two brush holders 27 are oriented with respect to each other as shown in FIG. 6, so that the clips, when installed, face opposite directions. This simplifies the wire connections with the clips. The brush holders are bolted to the brush holder bracket by bolts that are received by holes 95. Referring to FIG. 2, the brush holders 27 are located close to the slip rings 23 so that the brushes 85, which protrude out of the cavities, can contact the slip rings.

The brush holder bracket 25 has end walls 97 that extend in an axial direction. The end walls receive a housing 99 or cover, a portion of which has been broken away in FIGS. 1 and 2 to more clearly illustrate the slip rings and brush holders. The housing 99 and the bracket 25 completely encase the slip rings 23 and the brush holders 27 so as to protect the slip rings and brush holders from the environment and moisture, thereby extending the life of the brushes. Screws are used to couple the housing to the bracket 25. The housing is removable to allow access to the slip rings and brush holders.

The brush holder bracket 25 has an extension 101 (see FIG. 1) that is used to position a speed sensor 103 adjacent to the rotating armature. The outer surface of the armature 19 is scored at regular intervals (see FIG 2). In the preferred embodiment, the scoring takes the form of grooves 105 which form peaks 107. The sensor 103 is a magnetic pulse pickup. Thus, as the steel armature 19 rotates, every peak 107 is counted. Conventional control circuitry, not shown, is used to monitor the signal produced by the sensor and to control the amount of current supplied to the brush in order to control the speed of the armature rotation.

The drive need not be supplied with a speed sensor. Many applications already have control systems. For example, in HVAC, inputs of temperature and pressure are used to control the speed of the armature rotation.

The assembly of the drive will now be described, referring to FIG. 1. The bearings 45 are installed and secured onto the hub 13. Then, the armature and sheave assembly 19, 21 are installed and secured onto the bearings 45. The pole pieces 15 and coil 17 are assembled together to make up an annular electromagnet. The pole pieces 15 and coil 17 are installed onto the hub 13 with the pole pieces in abutting relationship with the shoulder 43. The pole pieces are then bolted 41 in place. The fan 57 and the slip ring shaft 63 are bolted 65 together. The fan assembly is bolted 59 to the pole pieces. The center 111 of the fan is disk shaped and received by the hub cavity 29 to center the fan with respect to the pole pieces. The support bracket 25 is then mounted, by way of bearings 79, to the slip ring shaft. Then, the brush holders 27 and speed sensor 103 are coupled to the bracket 25.

The drive 11 is then installed onto a motor shaft 31. The motor shaft 31 is inserted into the hub cavity 29 and a compression disk is used to firmly secure the hub to the shaft. The cover 99 is installed onto the bracket 25.

The conduit 93, which contains the wires connected to the brushes, is anchored to a fixed platform, such as the motor 33. A bracket 33A is used to couple the conduit 93 to the motor 33. The wires from the speed sensor 103 are typically tie wrapped to the outside of the conduit 93.

In the preferred embodiment, the conduit 93 is positioned between the sheaves 21 and the load. Thus, when the belts are installed on the sheaves, the conduit 93 extends through the loops formed by the belts; that is the belts 22 extend around both the sheaves 21 and the conduit 93. This arrangement of the conduit 93 through the belts 22, together with the arrangement of the slip rings and the bracket on the outer end of the drive, away from the sheaves, allows the belts to be installed and removed from the sheaves and the load, without disconnecting the conduit and without removing the bracket 25 and the brush holders 27. Thus, the belts can be quickly installed or removed without disturbing the drive, thereby reducing maintenance and down times.

The sheaves 21 are fully supported by the bearings 45, thereby providing long operational life of the sheaves and bearings 45. In addition, the sheaves and the bulk of the mass (the electromagnet) are located close to the motor 33. This arrangement reduces the overhung load on the motor shaft.

The operation of the drive 11 will now be described. The motor 33 is started and the shaft 31 is rotated. As the shaft rotates, it rotates the pole pieces 15 and the coil 17. The sheaves 21 do not rotate, as they are held stationary by the load.

To rotate the sheaves, a selected amount of current is provided to the coil, by way of the brushes and slip rings. This energizes the coil, which causes an electromagnetic field to be developed between adjacent poles. The armature becomes electromagnetically coupled to the pole pieces, wherein the armature and the sheaves are rotated. If the electromagnetic field is weak, then there will be some slip between the armature and the pole pieces. Thus, for every revolution of the pole pieces, the armature will rotate less than one revolution. By controlling the strength of the energizing current to the coil, the amount of slippage and the speed of the armature can be controlled.

The drive 11 may be partially disassembled for maintenance and inspection purposes without uncoupling the drive from the load. Thus, the belts may be retained on the sheaves 21 during partial disassembly. To partially disassemble the drive 11, the bolts 59 are removed, thereby allowing the fan 57, slip ring shaft 63 and bracket 25 to be removed from the pole pieces 15. Then, the bolts 41 are removed, thereby allowing the pole pieces 15 and coil 17 to be removed from the interior cavity 56 of the armature 19. The electromagnet (the pole pieces and the coil) and the slip ring arrangement can be worked on and then reinstalled. During the partial disassembly of the drive, the hub 13 and armature-sheave assembly 19, 21 remain coupled to the motor shaft and to the load. Thus, the design of the drive simplifies maintenance and inspection procedures.

Replacing the brushes 85 is also simple. One method involves removing the clip 91 (see FIG. 8). The contact 94 and brush 85 are then removed and replaced, and the clip 91 is reinstalled. Thus, the brush holders 27 remain coupled to the bracket 25. Another method of changing the brushes involves removing and disassembling the brush holders 27 into their first and second portions 82, 83. This procedure allows the brush holders to be cleaned of carbon dust. After cleaning, the brush holders are reassembled and new brushes are installed.

Replacement of the slip rings 23 is also simplified, requiring only removal of the end plate 73, slipping the slip rings off of the shaft 63 and reinstalling a new pair. Replacement of the brushes and slip rings can be performed while leaving the drive intact on the motor shaft 31.

The foregoing disclosure and the showings made in the drawings are merely illustrative of the principles of this invention and are not to be interpreted in a limiting sense.

I claim:

1. A variable speed drive, comprising:
   a) a hub that is structured and arranged to be coupled to a motor shaft, said hub having a shoulder that is directly coupled to said hub said shoulder extending in a direction that is transverse to an axis of rotation of said hub;
   b) an electromagnet mounted on said hub and abutting against said shoulder, said electromagnet being directly coupled to said hub so as to rotate in unison with said hub;
   c) a driven member mounted to said hub by bearings, said driven member having a load portion and an armature, said load portion being structured and arranged to be rotatably coupled to a load, said armature being located adjacent to said electromagnet.

2. A variable speed drive, comprising:
   a) a hub that is structured and arranged to be coupled to a motor shaft, said hub having a shoulder that is coupled to said hub;
   b) an electromagnet mounted on said hub and abutting against said shoulder, said electromagnet being coupled to said hub;
   c) a driven member mounted to said hub by bearings, said driven member having a load portion and an armature, said load portion being structured and arranged to be rotatably coupled to a load, said armature being located adjacent to said electromagnet;
   d) first and second ends on said hub, with said first end receiving said motor shaft;
   e) slip rings located adjacent to said hub second end, said slip rings being electrically coupled to said electromagnet.

3. The drive of claim 2 wherein said slip rings have a diameter that is smaller than a diameter of said load portion.

4. The drive of claim 2 further comprising a slip ring support coupled to said electromagnet, said slip ring support extending away from said hub second end, said slip rings being located on said slip ring support.

5. The drive of claim 4 further comprising:
   a) a brush holder support mounted to said slip ring support by bearings;
   b) brush holders coupled to said brush holder support and positioned adjacent to said slip rings.

6. The drive of claim 5 further comprising a speed sensor coupled to said brush holder support and positioned adjacent to said armature.

7. The drive of claim 5 further comprising a housing coupled to said brush holder support and encompassing said slip rings and said brush holders.

8. The drive of claim 5 wherein said brush holders comprise first and second portions, with each portion having a groove, said respective groove being aligned with each other so as to form a cavity when said first and second portions are assembled together, said cavity receiving a brush.

9. The drive of claim 5, wherein said load portion is located adjacent to said first end of said hub, further comprising:
   a) a belt extending around said load portion so as to form a loop;
   b) means for anchoring said support bracket, said anchoring means extending through said belt loop.

10. The drive of claim 5 further comprising a fan coupled to said electromagnet.

11. A variable speed drive, comprising:
    a) a hub that is structured and arranged to be coupled to a motor shaft, said hub having a shoulder that is coupled to said hub;
    b) an electromagnet mounted on said hub and abutting against said shoulder said electromagnet being coupled to said hub;
    c) a driven member mounted to said hub by bearings, said driven member having a load portion and an armature, said load portion being structured and arranged to be rotatably coupled to a load said armature being located adjacent to said electromagnet;
    d) a fan coupled to said electromagnet.

12. A variable speed drive, comprising:
    a first rotatable member that comprises pole pieces and a drive coil;
    a second rotatable member that comprises an armature;
    one of said first rotatable member or said second rotatable member comprising a hub, the other of said first rotatable member or said second rotatable member being structured and arranged to be coupled to a load;
    said pole pieces having plural interdigitated poles, said poles being separated from said armature by a gap;
    said drive coil located adjacent to said pole pieces, said pole pieces providing a path for a magnetic field produced by said drive coil;

said hub having first and second ends, said hub first end having an opening for receiving a motor shaft, said hub being structured and arranged to rotate about an axis of rotation;

a shaft that is coupled to said first rotatable member, said shaft located adjacent to said hub second end, said shaft being structured and arranged to rotate about said axis of rotation;

a rotating conductor coupled to said shaft, said rotating conductor being electrically coupled to said drive coil;

a stationary conductor rotatably coupled to said shaft, said stationary conductor being electrically coupled to said rotating conductor and being stationary relative to said rotating conductor.

13. The variable speed drive of claim 12, further comprising:

a support rotatably coupled to said shaft;

a speed sensor coupled to said support, said speed sensor located adjacent to said other of said first rotatable member or said second rotatable member that is structured and arranged to be coupled to said load;

means for maintaining said support stationary with respect to said shaft.

* * * * *